United States Patent
Chen et al.

(10) Patent No.: US 8,045,065 B2
(45) Date of Patent: Oct. 25, 2011

(54) SOG SIGNAL DETECTION CIRCUIT

(75) Inventors: Yung-Hung Chen, Hou Lung Town (TW); Po-Jen Huang, Taipei (TW)

(73) Assignee: Sunplus Technology Co., Ltd., Hsin-Chu (TW)

(*) Notice: Subject to any disclaimer, the term of this patent is extended or adjusted under 35 U.S.C. 154(b) by 1093 days.

(21) Appl. No.: 11/892,758

(22) Filed: Aug. 27, 2007

(65) Prior Publication Data

US 2008/0062316 A1    Mar. 13, 2008

(30) Foreign Application Priority Data

Sep. 11, 2006   (TW) ............................... 95133403 A (51) Int. Cl.
*H04N 5/18*   (2006.01)
*H04N 5/16*   (2006.01)
*H04N 5/08*   (2006.01)

(52) U.S. Cl. ......... 348/689; 348/534; 348/695; 348/697

(58) Field of Classification Search .................. 348/689, 348/691–697, 532–534; 345/204

See application file for complete search history.

(56) References Cited

U.S. PATENT DOCUMENTS

| | | | | |
|---|---|---|---|---|
| 5,379,075 A | * | 1/1995 | Nagasawa et al. | 348/678 |
| 5,867,222 A | * | 2/1999 | Norris et al. | 348/528 |
| 2004/0090558 A1 | * | 5/2004 | Takahashi et al. | 348/691 |
| 2005/0270421 A1 | | 12/2005 | Lu | |

* cited by examiner

*Primary Examiner* — Andrew Koenig
*Assistant Examiner* — Jason J Chung
(74) *Attorney, Agent, or Firm* — Muncy, Geissler, Olds & Lowe, PLLC (57) ABSTRACT

A Sync On Green signal detection circuit includes a clamping circuit for clamping a voltage of a video graphics signal within a default range and then outputting a clamped input signal; a first PGA (programmable gain amplifier) for receiving and amplifying the clamped input signal by a first gain to generate a first gain signal; a first low-pass filter for receiving the first gain signal and then generating a first filtered signal; a second PGA for receiving and amplifying the clamped input signal by a second gain to generate a second gain signal, wherein the second gain is different from the first gain; a second low-pass filter for receiving the second gain signal and then generating a second filtered signal; a programmable voltage shifter for receiving and adjusting the first filtered signal and then outputting a level shifted signal; and a comparator for receiving the level shifted signal and the second filtered signal and then generating a comparison signal as a SOG signal.

9 Claims, 7 Drawing Sheets

SOG SIGNAL DETECTION CIRCUIT

This application claims the benefit of the filing date of Taiwan Application Ser. No. 095133403, filed on Sep. 11, 2006, the content of which is incorporated herein by reference.

BACKGROUND OF THE INVENTION

1. Field of Invention

The invention relates to a Sync On Green (SOG) signal detection circuit, and more particularly to a SOG signal detection circuit using a programmable gain amplifier and a low-pass filter (PGA/LPF) to enhance the ability against the noise interference.

2. Related Art

Figure 1A:
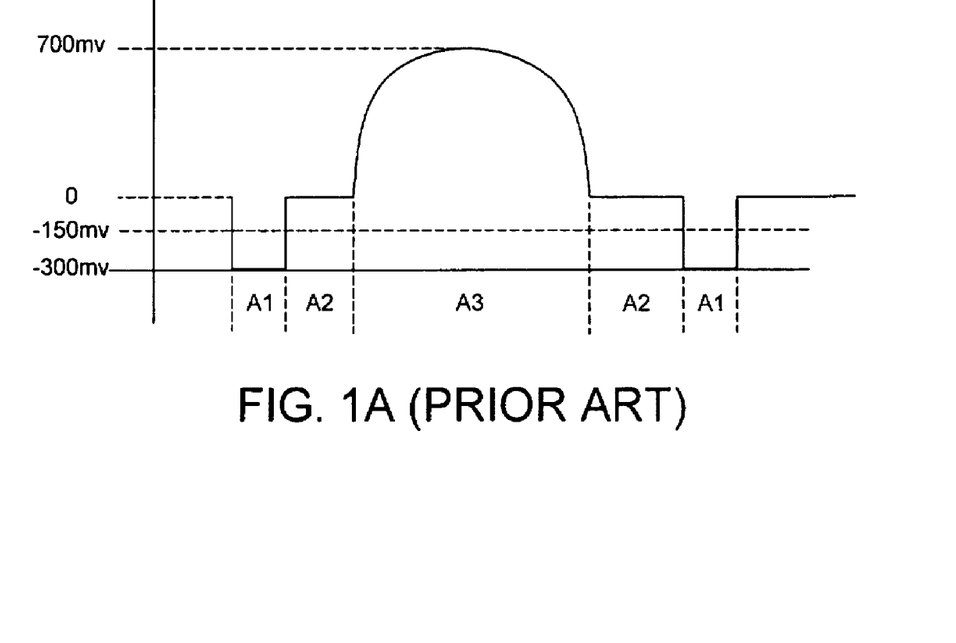
FIG. 1A is a schematic illustration showing a conventional video graphics signal.

FIG. 1A is a schematic illustration showing a typical video graphics signal. Referring to FIG. 1A, the video graphics signal includes a sync signal A1, a blank zone A2 and a data zone A3. According to the specification, the signal has a level of about 300 mV between the sync signal A1 and the blank zone A2 and a level of about 700 mV between the blank zone A2 and the data zone A3. A video display device typically utilizes a SOG signal detection circuit to detect the sync signal A1 to serve as a control parameter for display.

Figure 1B:
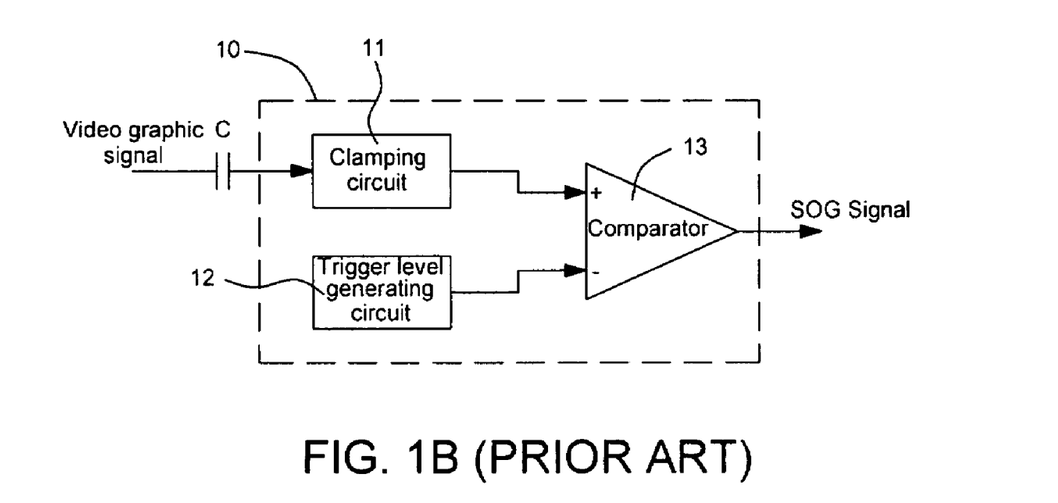
FIG. 1B shows a conventional SOG signal detection circuit.

FIG. 1B shows a conventional SOG signal detection circuit 10. Referring to FIG. 1B, the SOG signal detection circuit 10 includes a clamping circuit 11, a trigger level generator 12 and a comparator 13. The video graphics signal is inputted to the clamping circuit 11 through a capacitor C, and the clamping circuit 11 clamps the video graphics signal within a set voltage range and generates a clamped input signal. The trigger level generator 12 generates a fixed level of trigger voltage. The SOG signal detection circuit 10 further utilizes the comparator 13 to compare the clamped input signal with the trigger voltage and then output a SOG signal.

The SOG signal contains a content of the video graphics signal (i.e., the content of the data zone A3), and the above-mentioned method cannot easily detect the synchronization information. In addition, the power noise and the input noise often interfere with the signal that may be detected. Also, the video graphics signal is coupled to the chip by way of AC coupling, and the clamping voltage thereof is interfered with the noise so that a larger jitter is generated. Meanwhile, the chip typically has the hot plugging function, so the chip also has to hold the normal operation in the short period of time for hot plugging.

In the prior art mentioned hereinabove, the video graphics signal has a level of 300 mV between the sync signal A1 and the blank zone A2, and the smaller noise margin (i.e., the poor ability against the noise interference). If only the trigger level generator 12 is utilized to generate a fixed comparison voltage, the SOG signal cannot be generated effectively.

Figure 2:
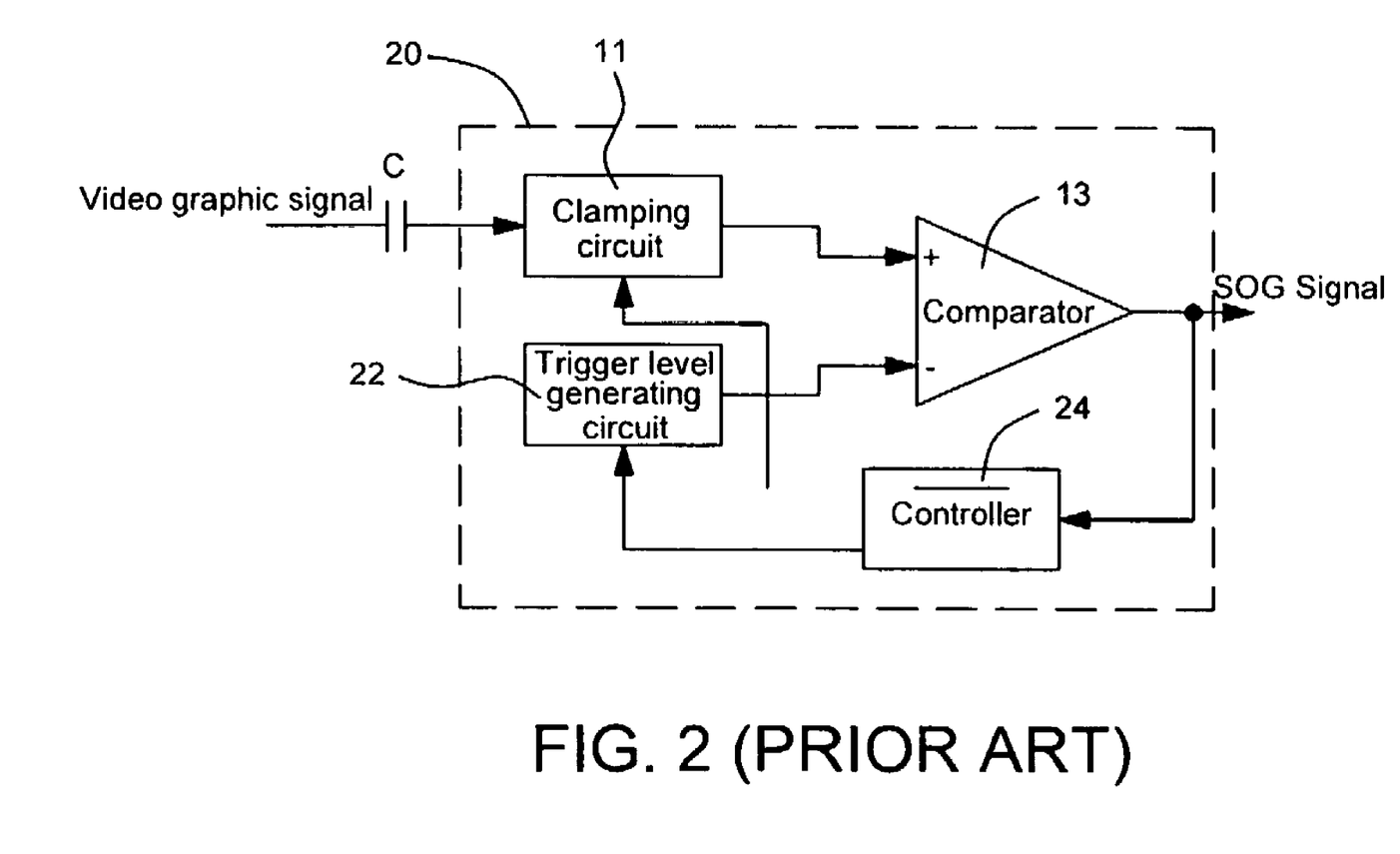
FIG. 2 shows another conventional SOG signal detection circuit.

FIG. 2 shows a SOG signal detection circuit 20 disclosed in U.S. Patent Publication No. 2005/0270421 A1. As shown in FIG. 2, the SOG signal detection circuit 20 includes a clamping circuit 11, a trigger level generator 22 and a comparator 13, and further includes a controller 24. The SOG signal detection circuit 20 can utilize the controller 24 to adjust the comparison voltage generated by the trigger level generator 22 according to the SOG signal. However, the level of the video graphics signal between the sync signal A1 and the blank zone A2 is only about 300 mV, so the noise margin is still smaller and the effect against the noise interference is also poor.

SUMMARY OF THE INVENTION

It is therefore an object of the invention to provide a Sync On Green (SOG) signal detection circuit capable of increasing a noise margin and enhancing the effect against the noise interference.

Another object of the invention is to provide a SOG signal detection circuit including a programmable gain amplifier/low-pass filter.

The invention achieves the above-identified objects by providing a Sync On Green (SOG) signal detection circuit including a clamping circuit, a first programmable gain amplifier, a first low-pass filter, a second programmable gain amplifier, a second low-pass filter, a voltage shifter and a comparator. The clamping circuit receives a video graphics signal as an input signal, clamps a voltage of the video graphics signal within a default range, and thus outputs a clamped input signal. The first programmable gain amplifier receives the clamped input signal, amplifies amplitude of the clamped input signal by a first gain and thus generates a first gain signal. The first low-pass filter receives the first gain signal and then generates a first filtered signal. The second programmable gain amplifier receives the clamped input signal, amplifies the amplitude of the clamped input signal by a second gain, and thus generates a second gain signal, wherein the second gain is different from the first gain. The second low-pass filter receives the second gain signal and then generates a second filtered signal. The programmable voltage shifter receives the first filtered signal, adjusts a DC level of the first filtered signal and thus outputs a level shifted signal. The comparator compares the level shifted signal with the second filtered signal and thus generates a comparison signal as a SOG signal.

When the first gain is greater than the second gain, the voltage shifter down-shifts a voltage of the first filtered signal so that a maximum of the level shifted signal is greater than a maximum of the second filtered signal and a minimum of the level shifted signal is lower than a minimum of the second filtered signal. When the first gain is smaller than the second gain, the voltage shifter up-shifts the voltage of the first filtered signal so that the maximum of the level shifted signal is smaller than the maximum of the second filtered signal and the minimum of the level shifted signal is greater than the minimum of the second filtered signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The SOG signal detection circuit according to the invention will be described with reference to the accompanying drawings.

Figure 3A:
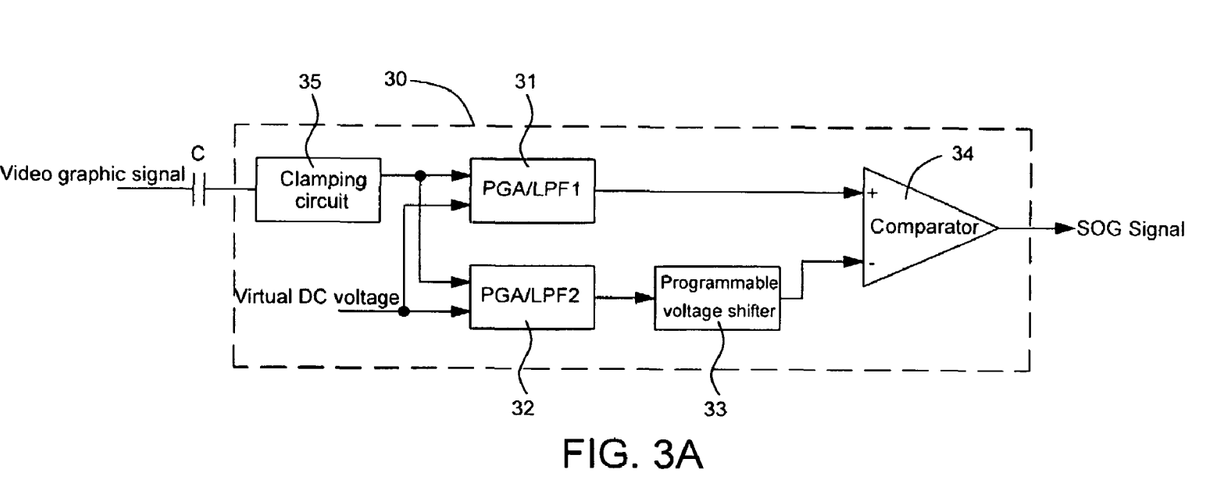
FIG. 3A is a circuit block diagram showing a SOG signal detection circuit according to a first embodiment of the invention.

FIG. 3A is a circuit block diagram showing a SOG signal detection circuit 30 according to a first embodiment of the invention. Referring to FIG. 3A, the SOG signal detection circuit 30 of the invention includes a first programmable gain amplifier/low-pass filter (PGA/LPF1) 31, a second programmable gain amplifier/low-pass filter (PGA/LPF2) 32, a programmable voltage shifter 33, a comparator 34 and a clamping circuit 35. The PGA/LPF1 31 includes a first programmable gain amplifier and a first low-pass filter, while the PGA/LPF2 32 includes a second programmable gain amplifier and a second low-pass filter. The function and architecture of each of the comparator 34 and the clamping circuit 35 are the same as those in the prior art, so detailed descriptions thereof will be omitted.

The clamping circuit 35 receives a video graphics signal through a capacitor C and then generates a clamped input signal. In this embodiment, a first gain of the first programmable gain amplifier of the PGA/LPF1 31 is set as 2, while a second gain of the second programmable gain amplifier of the PGA/LPF2 32 is set as 1. Of course, the first and second gains are not restricted thereto as long as the two gains are obviously different from each other.

Figure 4A:
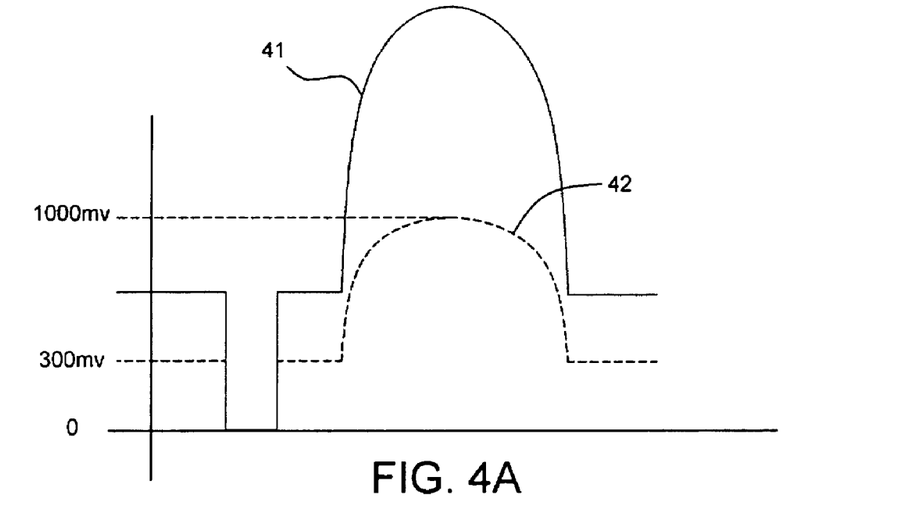
FIG. 4A shows waveforms of first and second filtered signals.

The PGA/LPF1 31 and the PGA/LPF2 32, each of which receives the clamped input signal and a virtual DC voltage, respectively generate a first filtered signal 41 and a second filtered signal 42, as shown in FIG. 4A. Because the gain of the first programmable gain amplifier is 2 and the gain of the second programmable gain amplifier is 1, amplitude of a curve 41 is about a double of that of a curve 42. Because the PGA/LPF1 31 and the PGA/LPF2 32 receive the virtual DC voltage, the problem of the momentary hot plugging can be solved. The gain of the amplifier of each of the PGA/LPF1 31 and the PGA/LPF2 32 is very great, so the voltages of the positive input terminal and the negative input terminal are almost equal to each other. Moreover, the clamped input signal is connected to the positive input terminal of the amplifier through a resistor R1, and the clamped input signal cannot fluctuate up and down too much due to the hot plugging. Meanwhile, the voltages of two input terminals of the comparator fluctuate up and down together, so the problem of the momentary hot plugging can be effectively solved.

Figures 4B, 4C:
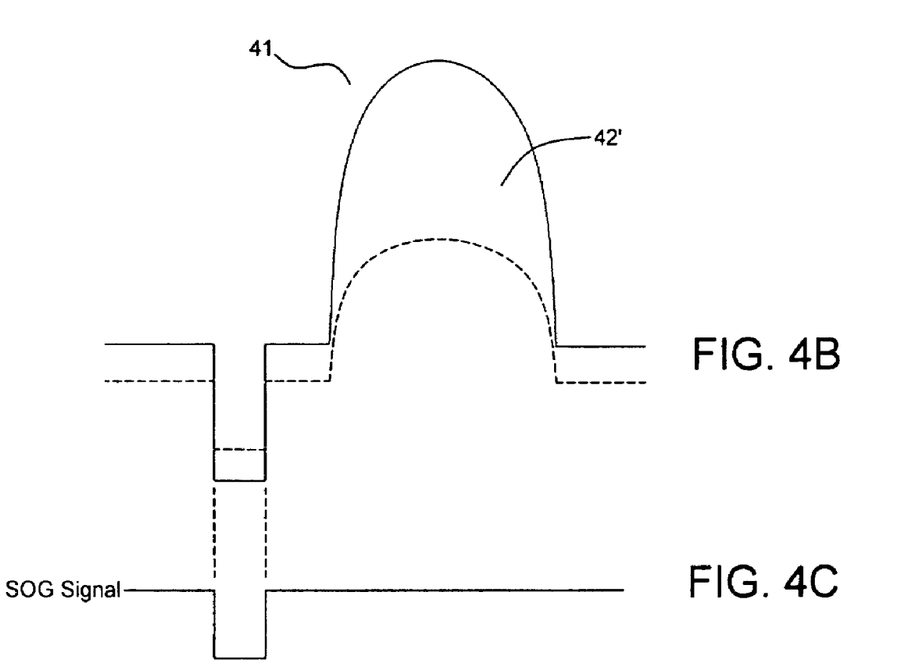
FIG. 4B shows waveforms of the first filtered signal and a shifted signal.
FIG. 4C shows a waveform of the SOG signal.

The programmable voltage shifter 33 receives the second filtered signal 42 and adds a shift voltage to the second filtered signal 42 to generate an up-shifted voltage 42'. In FIG. 4B, the curve 41 represents a first filtered signal, and the curve 42' represents a level shifted signal of the second filtered signal 42, which is up-shifted by the programmable voltage shifter 33. The object of the provision of the programmable voltage shifter 33 will be described in the following. When the first gain is smaller than the second gain, the programmable voltage shifter down-shifts the voltage of the second filtered signal to obtain the level shifted signal so that a maximum of the level shifted signal is greater than a maximum of the first filtered signal and a minimum of the level shifted signal is lower than a minimum of the first filtered signal. When the first gain is greater than the second gain, the programmable voltage shifter up-shifts the voltage of the second filtered signal so that the maximum of the level shifted signal is smaller than the maximum of the first filtered signal and the minimum of the level shifted signal is higher than the minimum of the first filtered signal.

The comparator 34 receives the first filtered signal 41 and the level shifted signal 42' and then compares the first filtered signal 41 with the level shifted signal 42' to generate a SOG signal. As shown in FIGS. 4B and 4C, the first filtered signal 41 is amplified twice but the second filtered signal 42 is not amplified, and the second filtered signal 42 is up-shifted by the programmable voltage shifter 33, the comparator 34 can correctly generate the SOG signal, as shown in FIG. 4C.

Figure 3B:
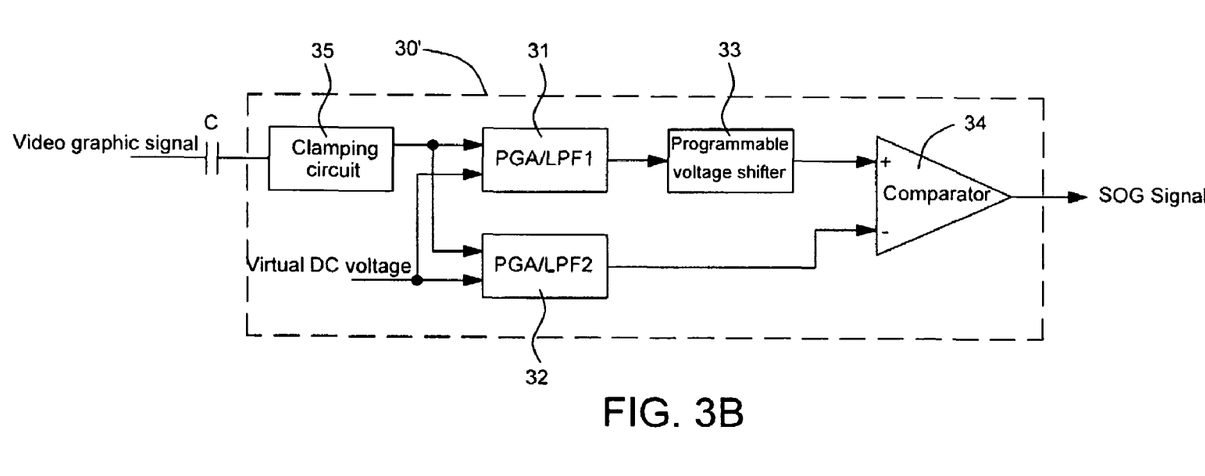
FIG. 3B is a circuit block diagram showing a SOG signal detection circuit according to a second embodiment of the invention.

FIG. 3B is a circuit block diagram showing a SOG signal detection circuit according to a second embodiment of the invention. As shown in FIG. 3B, the SOG signal detection circuit 30' of this embodiment is almost the same as the SOG signal detection circuit 30 of the first embodiment except that the programmable voltage shifter 33 of the SOG signal detection circuit 30' is to shift the first filtered signal, while the programmable voltage shifter 33 of the SOG signal detection circuit 30 is to shift the second filtered signal.

Figure 5:
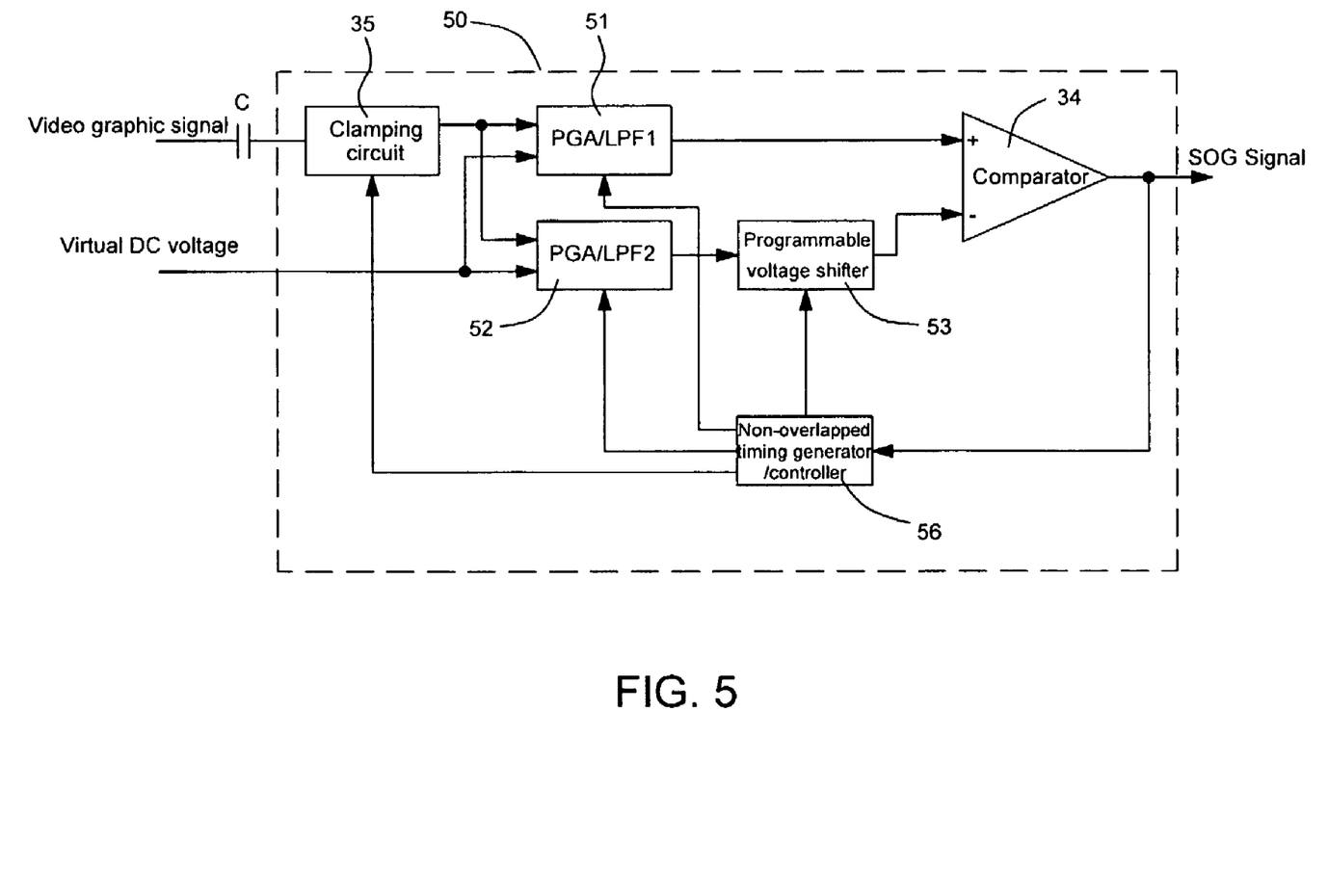
FIG. 5 is a circuit block diagram showing a SOG signal detection circuit according to a third embodiment of the invention.

FIG. 5 is a circuit block diagram showing a SOG signal detection circuit 50 according to a third embodiment of the invention. Referring to FIG. 5, the SOG signal detection circuit 50 of the invention includes a first programmable gain amplifier/low-pass filter 51, a second programmable gain amplifier/low-pass filter 52, a programmable voltage shifter 53, a comparator 34 and a clamping circuit 35, and further includes a non-overlapped timing generator/controller 56.

The SOG signal has different bandwidths under different signal modes. Thus, the bandwidth of the low-pass filter has to be designed according to the different bandwidths. A first method is to record the bandwidth using a register and to write parameters into the register. So, the changed parameters have to be written into the register when different signal modes have to be switched in the first and second embodiments. In the third embodiment, the non-overlapped timing generator/controller 56 detects the variation of the SOG signal and then automatically writes the to-be-changed parameters into the register. The non-overlapped timing generator/controller 56 mainly controls the clamp timing of the clamping circuit 35, controls the shift voltage of the programmable voltage shifter 53 and controls the gains and the bandwidths of the programmable gain amplifier/low-pass filters 51 and 52.

If the SOG signal does not have the regular variation, it represents that the mode detection fails. At this time, the non-overlapped timing generator/controller 56 has to change the gain ratio of the programmable gain amplifier/low-pass filters 51 and 52, and properly control the shift voltage of the programmable voltage shifter 53 (e.g., to shift the shift voltage from low to high) so that the SOG signal can be successfully detected. In addition, after successfully detecting the mode, the non-overlapped timing generator/controller 56 can adjust the bandwidths of the first and second low-pass filters to further filter out the different modes of noises.

Figure 6:
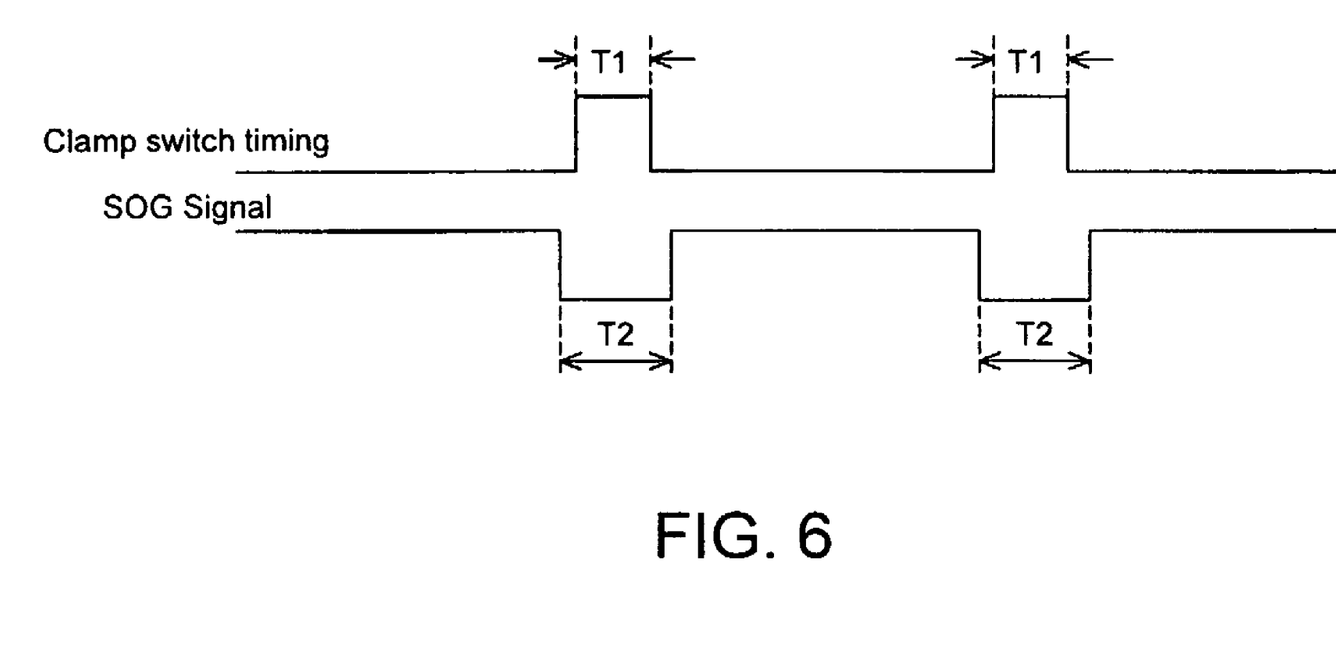
FIG. 6 shows the relationship between the clamp switch timing and the SOG signal outputted from the non-overlapped timing generator/controller 56.

FIG. 6 shows the relationship between the clamp switch timing and the SOG signal outputted from the non-overlapped timing generator/controller 56. As shown in FIG. 6, the enable period (T1) of the timing of the clamp switch falls within a logic 0 period (T2) of the SOG signal. That is, the clamp switch only can be enabled in the logic 0 period of the SOG signal.

Figure 7:
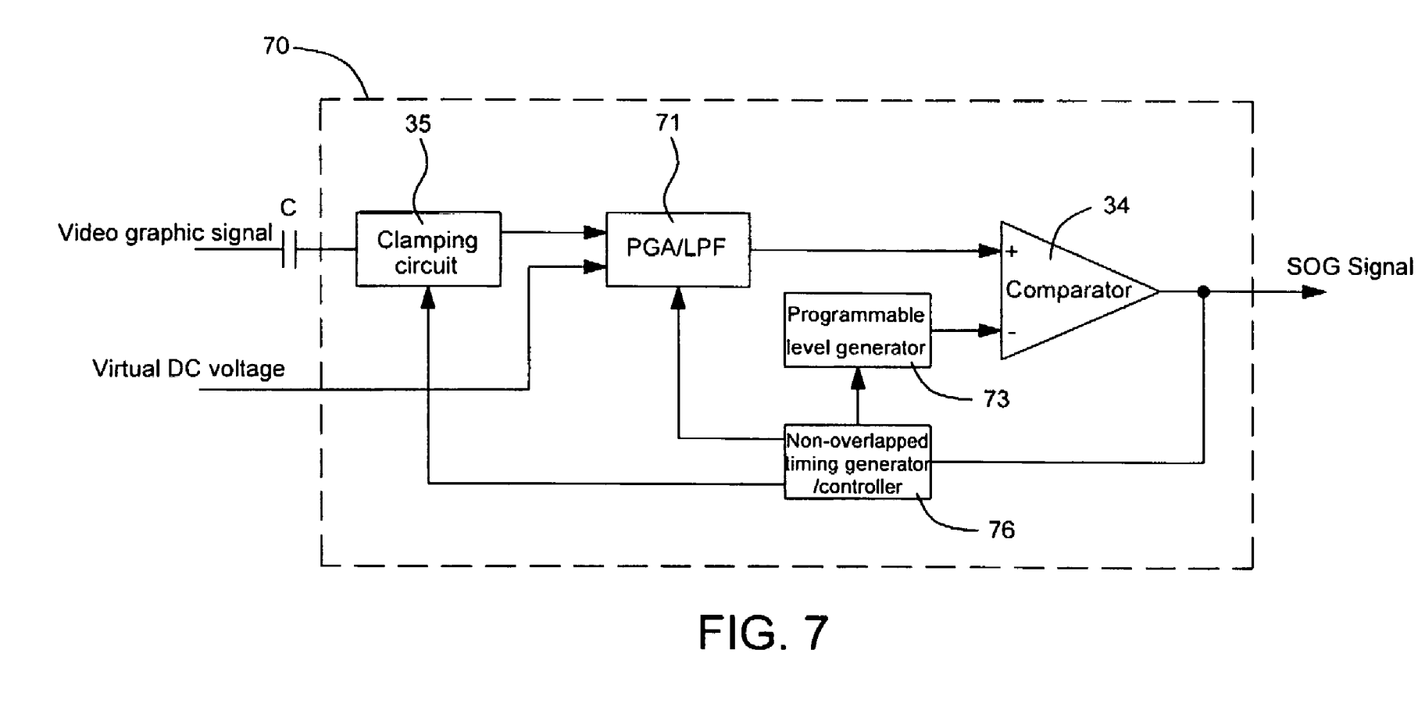
FIG. 7 is a circuit block diagram showing a SOG signal detection circuit according to a fourth embodiment of the invention.

FIG. 7 is a circuit block diagram showing a SOG signal detection circuit 70 according to a fourth embodiment of the invention. Referring to FIG. 7, the SOG signal detection circuit 70 of the invention includes a programmable gain amplifier/low-pass filter 71, a programmable level generator 73, a comparator 34, a non-overlapped timing generator/controller 76 and a clamping circuit 35.

The non-overlapped timing generator/controller 76 detects the variation of the SOG signal and then automatically writes the to-be-changed parameters into the register. The non-overlapped timing generator/controller 76 mainly controls the clamp timing of the clamping circuit 35, the level voltage of the programmable level generator 73 and the gain and the bandwidth of the programmable gain amplifier/low-pass filter 71.

The difference between the fourth embodiment and the third embodiment is that the embodiment only includes one programmable gain amplifier/low-pass filter and a required comparison level voltage is generated using the programmable level generator 73. In addition, although each of the programmable level generator 73 and the programmable voltage shifter 53 can generate a comparison level voltage, the programmable voltage shifter 53 shifts the voltage outputted from the programmable gain amplifier/low-pass filter, and then outputs the shifted voltage. Also, the programmable level generator 73 does not receive the voltage outputted from the programmable gain amplifier/low-pass filter but directly generates the comparison level voltage according to the parameters. If the SOG signal does not have the regular variation, it represents that the mode detection fails. At this time, the non-overlapped timing generator/controller 76 has to change the gain of the programmable gain amplifier/low-pass filter 71 and properly control the level voltage of the programmable level generator 73 (e.g., to shift the level voltage from low to high) so that the SOG signal can be successfully detected. In addition, after successfully detecting the mode, the non-overlapped timing generator/controller 76 can adjust the bandwidth of the low-pass filter to further filter out different modes of noises.

Thus, the SOG signal detection circuit of the invention has one programmable gain amplifier/low-pass filter or a pair of programmable gain amplifier/low-pass filters for generating the comparison signal so that the effect against the noise interference can be enhanced. In addition, the SOG signal detection circuit of the invention can further utilize the non-overlapped timing generator/controller to automatically detect the video mode and automatically adjust the gain of the programmable gain amplifier/low-pass filter so that the detection of the SOG signal becomes more precise.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A Sync On Green (SOG) signal detection circuit, comprising:
    a clamping circuit, for receiving a video graphics signal as an input signal, clamping a voltage of the input signal within a default range, and thus outputting a clamped input signal;
    a first programmable gain amplifier, for receiving the clamped input signal, amplifying amplitude of the clamped input signal by a first gain and thus generating a first gain signal;
    a first low-pass filter, for receiving the first gain signal and then generating a first filtered signal;
    a second programmable gain amplifier, for receiving the clamped input signal, amplifying the amplitude of the clamped input signal by a second gain, and thus generating a second gain signal, wherein the second gain is different from the first gain;
    a second low-pass filter, for receiving the second gain signal and then generating a second filtered signal;
    a programmable voltage shifter, for receiving the first filtered signal, adjusting a DC level of the first filtered signal and thus outputting a level shifted signal; and
    a comparator, for comparing the level shifted signal with the second filtered signal and thus generating a comparison signal as an output signal;
    wherein when the first gain is greater than the second gain, the voltage shifter down-shifts a voltage of the first filtered signal so that a maximum of the level shifted signal is greater than a maximum of the second filtered signal and a minimum of the level shifted signal is lower than a minimum of the second filtered signal; and when the first gain is smaller than the second gain, the voltage shifter up-shifts the voltage of the first filtered signal so that the maximum of the level shifted signal is smaller than the maximum of the second filtered signal and the minimum of the level shifted signal is greater than the minimum of the second filtered signal.

2. The circuit according to claim 1, wherein the second gain is equal to a double of the first gain.

3. The circuit according to claim 2, wherein the first gain is 1.

4. The circuit according to claim 1, wherein the second gain is equal to one half of the first gain.

5. The circuit according to claim 4, wherein the first gain is 2.

6. The circuit according to claim 1, further comprising a non-overlapped timing generator for receiving the comparison signal and then generating a control signal to control bandwidths of the first low-pass filter and the second low-pass filter, to control a level offset of the voltage shifter and to control a clamp switch of the clamping circuit.

7. The circuit according to claim 1, wherein the comparator has a positive input terminal for receiving the level shifted signal and a negative input terminal for receiving the second filtered signal.

8. The circuit according to claim 1, wherein the comparator has a positive input terminal for receiving the second filtered signal and a negative input terminal for receiving the level shifted signal.

9. A Sync On Green (SOG) signal detection circuit, comprising:

a clamping circuit, for receiving a video graphics signal as an input signal, clamping a voltage of the input signal within a default range and then outputting a clamped input signal;

a programmable gain amplifier, for receiving the clamped input signal and amplifying amplitude of the clamped input signal by a gain to generate a gain signal;

a low-pass filter, for receiving the gain signal and then generating a filtered signal;

a programmable level generator, for generating a compared level signal;

a comparator, for receiving the compared level signal and the filtered signal and then generating a comparison signal as an output signal; and a non-overlapped timing generator/controller, for receiving the comparison signal and then generating a control signal to control a bandwidth of the low-pass filter, controlling the compared level signal of the programmable level generator and controlling a clamp switch of the clamping circuit.

\* \* \* \* \*